J. Naughten.
Bread Cutter.
Nº 18,597. Patented Nov. 10, 1857.
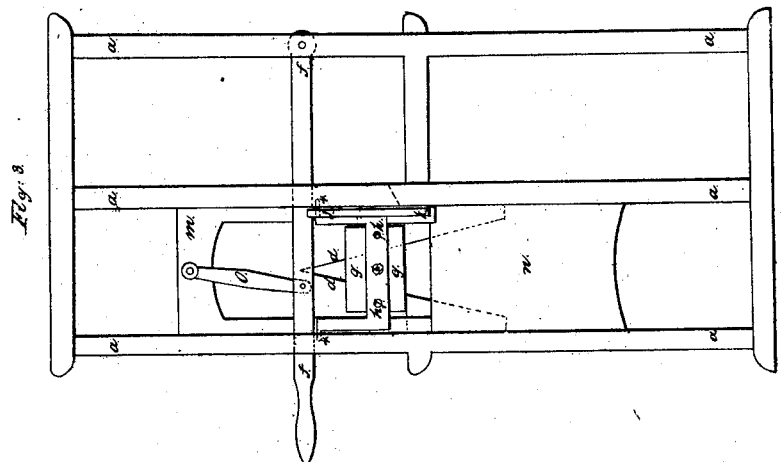
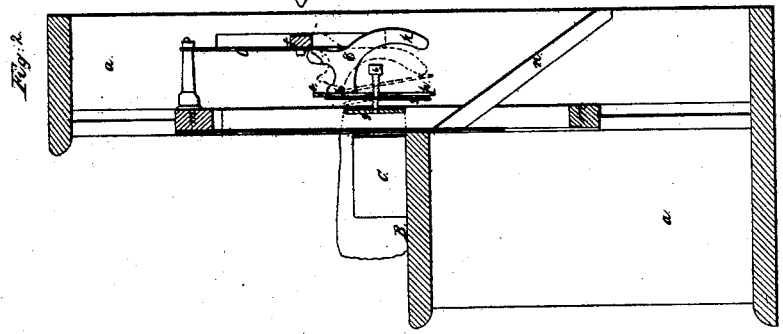
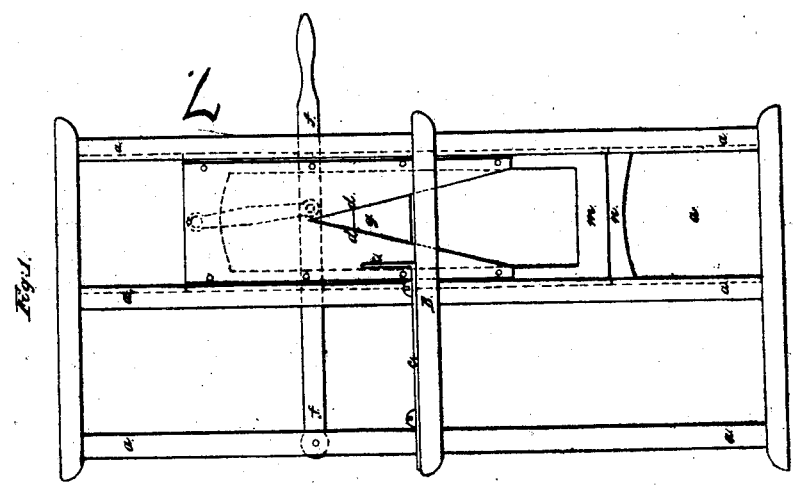

UNITED STATES PATENT OFFICE.

JAMES NAUGHTEN, OF CINCINNATI, OHIO.

MACHINE FOR CUTTING BREAD.

Specification of Letters Patent No. 18,597, dated November 10, 1857.

*To all whom it may concern:*

Be it known that I, JAMES NAUGHTEN, of the city of Cincinnati, county of Hamilton, and State of Ohio, have invented a new and useful Improvement Consisting of a Machine for Cutting Bread; and I do hereby declare that the following is an exact description thereof, reference being had to the accompanying drawings and to the letters of reference marked thereon and made to form part of this specification.

Similar letters refer to like parts of the improvement.

The nature of my improvement consists in the arrangement of the parts employed for gaging the thickness of the slice of bread cut combined with the parts of the apparatus for discharging the slice cut from the machine and resetting the gage by the action given to the gaging apparatus in operating the machine.

To enable others skilled in the art to make and use my improvement I will proceed to describe its construction and operation by referring direct to the accompanying drawings of which—

Figure 1, is a front elevation of the machine. Fig. 2, is a sectional elevation through the frame carrying the knife for cutting the bread and shows the arrangement of parts employed for actuating the gage for discharging the slice of bread from the machine after being cut, and Fig. 3, is a rear elevation of the machine.

The machine consists of a frame work *a, a, a*, as represented to which the parts of the machine are attached.

B is a table furnished with a guard plate (C) against which plate the bread is held when being presented to the cutter.

*d d* is a forked knife made in one or two pieces of plate steel and attached to the frame (*m*) which frame is worked by the lever *f, f*, and connecting-rod (*o*) as represented—the frame (*m*) being made to slide in grooves made in the framework of the machine.

*g* is a gage plate attached to the swinging plate *h, h*, by the screw (6) and guide rods 7, 7, for gaging the thickness of the slice of bread cut by moving the gage plate (*g*) to and from the knife *d, d*, with the screw (6) as may be desired at any time by the operator.

When the bread is cut the object is to discharge it from the gage and machine—and reset the gage preparatory for cutting another slice which is effected by having the lever *f, f*, employed for operating the knife after the slice of bread has been cut off to strike against the curved lever (J, K,) at its lower end—which throws the curved lever into a position denoted by the dotted lines— and the spring (5) attached to the frame— and made to press—against the inside of the swinging plate *h, h*,—for forcing the plate *h* out and with it the gage plate *g*— which frees and permits the slice of bread just cut—to fall from the machine down the duct (*n*)—and as the lever *f f* is elevated again together with the knife *d d* for cutting another slice it strikes the curved lever (J, K,) at its upper end which acts upon the swinging plate *h*, and with it resets the gage plate *g* ready for cutting another slice. By having that portion of the curved lever that acts—against the swinging plate made— straight—and a portion of the straight part of the curved lever (J, K,) to act on the swinging plate a little below the center 8, on which the curved lever works—which holds the swinging and gage plate (*g*) to their proper places—until moved by the lever *f, f,* acting on the curved-lever (J, K,) as and for purposes before mentioned.

The dotted lines in Fig. 2, represent the swinging and gage plates when in a position for discharging the bread cut from the machine—and the other position represented of the swinging and gage plates *h*, and *g*, show their position when the machine is in the act of cutting a slice of bread.

What I claim as my improvement and desire to secure by Letters Patent is—

The arrangement of the swinging plate (*h, h,*) gage plate (*g*) and set-screw (6)— when arranged with the spring (5) and curved-lever (J, K,) for gaging the thickness of the slice of bread cut and discharging it from the machine by the action of the lever (*f, f,*) on the curved lever (J, K,) all as and for purposes specified in the foregoing specification.

JAMES NAUGHTEN.

Witnesses:
M. BENSON,
CHARLES H. FOX.